(No Model.)

W. EDGE.
ART OF MAKING ORNAMENTAL CHAINS.

No. 266,278. Patented Oct. 24, 1882.

Fig. 9ᵃ

Witnesses.
H. D. Williams
E. G. Baker

William Edge
Inventor.
per Alfred Theolock
Atty.

UNITED STATES PATENT OFFICE.

WILLIAM EDGE, OF NEWARK, NEW JERSEY.

ART OF MAKING ORNAMENTAL CHAINS.

SPECIFICATION forming part of Letters Patent No. 266,278, dated October 24, 1882.

Application filed January 13, 1882. (No model.)

*To all whom it may concern:*

Be it known that I, WILLIAM EDGE, of Newark, county of Essex, State of New Jersey, have invented certain new and useful Improvements in the Art of Manufacturing Chains for Jewelry, &c., of which the following is a specification.

My invention relates to chains formed by combining together solid links by bending the ends of same, opening them, and passing through said open ends the successive links; and it consists of a novel method of combining such links together, whereby new kinds of chains are produced, as will be fully understood by reference had to the accompanying drawings.

Figure 1:
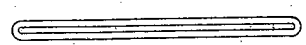
Figure 2:
Figure 3:

Figure 1 is a plan view of a link as cut out of sheet metal. Fig. 2 is a transverse section of the same. Fig. 3 is a similar section after passing through the stamping process to convert the continuous metal of the link into a cylindrical form. Figs. 4 to 18 represent the manner in which the links are combined and different views of a few styles of chains.

The views Figs. 1, 2, and 3 are enlarged to more clearly show the construction of the links, which are cut out of sheet metal, of any desired length and width, according to the style of chain to be made, the thickness of the sheet metal being such that the cross-section of the continuous metal of the link will be square, as shown at Fig. 2. When the metal of the finished link is to be cylindrical, as shown at Fig. 3, the link is operated on by suitable stamping-dies immediately after it is cut from the sheet; or the cross-section may be made polygonal, if desired. The links may be combined together to form chains without this rounding or shaping process, leaving the cross-section a square or a parallelogram, according to the relation of thickness of the sheet from which the links are cut to the width of the continuous metal of the links; and it will be understood that the other views of the drawings may be considered to represent chains made from links having either of these forms. The general principle upon which these links are combined together is as follows: The first link, *a*, has its end opened out and then bent up, through which open ends the second link, *b*, is passed and its ends opened and bent in a similar manner. The link *c* is then passed through the ends of *b* and treated in the same manner, and so on, each link thus passing through the bent open ends of the preceding one, as shown in Fig. 9, thus forming a single lock; or each link may be passed through the two preceding ones, as shown at Fig. 4, thus forming a double lock; or each link may be passed through the three preceding ones, as shown at Fig. 7, thus forming a triple lock to the chain, the number of preceding links through which each link is passed being governed by the style and stiffness of chain it is desired to make.

Figure 4:
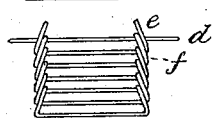
Figure 5:
Figure 6:
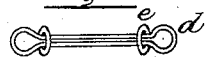
Figure 11:
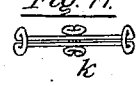
Figure 8:

The top link *d* of Fig. 4, of which Fig. 5 is a side elevation and Fig. 6 a plan view, is represented as passed through the bent open ends of the two preceding links *e f*, and with its ends opened out ready to be bent up. The top link *g* of Fig. 7, of which Fig. 8 is a side elevation, is shown as passed through the three preceding links *h*, *i*, and *j*.

Figure 9:
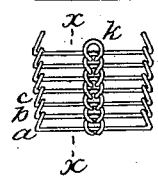
Figure 10:
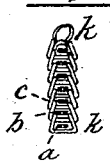
Figure 7:
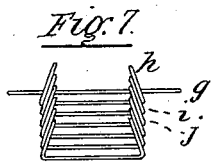
Figure 12:

The styles of chains represented by Figs. 4, 7, and the main part of Fig. 9 are flat wide chains having the appearance of interlocked link sides connected together by straight bars, and adapted to be used for bracelets, &c. The sides of the links forming the straight central bars may be opened out somewhat to allow a flat spring to be inserted in the middle of the chain to form spring-bracelets. These springs may be made of steel or polished gold. These flat chains form the foundation upon which is made the complete chain, according to my invention, which consists in combining therewith one or more series of links, *k*, as represented at Fig. 9ª, being passed transversely between the straight parts of the main links at their centers, opened at their ends, interlocked, and bent up in a similar manner to the method adapted in combining the long links. Fig. 9 represents such a chain. Fig. 10 is a section of same on line *x x*, and Fig. 11 a plan view. Or, the whole of the central part of the flat chain may be filled up with rows *l m n o* of said small links, Fig. 9ª, as represented at Fig. 12.

This improved method of manufacturing ornamental chains by interlocking two or more series of interlocked links at an angle to one another by passing the links of one series between the central parts of the links of one or more series of links is illustrated in the remaining views of the drawings.

Figure 13:
Figure 14:

Figs. 13 and 14 represent respectively an elevation and plan view of a square chain formed by interlocking at right angles two sets of short links. This chain may also be made substantially round by passing it through suitable rollers.

Figure 15:
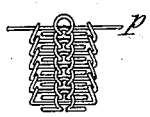
Figure 17:
Figure 16:
Figure 18:

Fig. 15 represents a similar interlocking of long links, but with their central parts opened out, as shown at Fig. 16, which is a plan view thereof. The top link $p$ is shown as having its ends opened out before being bent up, after this is done its central part will be opened out, as has been done to the preceding links, to form the hollow central opening, $q$, for the reception of a spring, if desired; and Figs. 17 and 18 represent respectively an elevation and plan view of a chain having a hexagonal form produced by interlocking three rows of links, $r\ s\ t$, with their central parts opened out, in a similar manner to the links of Figs. 15 and 16.

All or some of the links may be ornamented by means of engraved dies, if desired, and may also be polished before being put together, as described, or the chain polished when finished.

Chains may be made according to my improved method of closed links, interlocked, opened, and bent up, as set forth, when said links are made of wire with the ends soldered together.

It is obvious that innumerable styles and modifications of styles of chains may be made by means of my improved method of interlocking two or more series of narrow links and opening their ends and bending them, as described.

What I claim, and desire to secure by Letters Patent, is—

1. In an ornamental chain, in combination, two or more series of links interlocked, as set forth, each series composed of closed links passed through the opened bent ends of one, two, or more preceding links, and then opened out at their central parts to form a hollow chain, substantially as and for the purpose set forth.

2. In an ornamental chain, in combination, two or more series of links interlocked, as set forth, each series composed of closed links passed through the opened bent ends of one, two, or more preceding links, substantially as and for the purpose set forth.

In testimony whereof I have hereunto set my hand, at New York, county and State of New York, this 12th day of January, A. D. 1882.

WILLIAM EDGE.

In presence of—
H. D. WILLIAMS,
E. G. BAKER.